United States Patent [19]
Furutsu

[11] Patent Number: 5,721,983
[45] Date of Patent: Feb. 24, 1998

[54] CAMERA HAVING RED-EYE REDUCING FUNCTION

[75] Inventor: Etsuro Furutsu, Kawasaki, Japan

[73] Assignee: Canon Kabushiki Kaisha, Tokyo, Japan

[21] Appl. No.: 753,686

[22] Filed: Nov. 27, 1996

Related U.S. Application Data

[63] Continuation of Ser. No. 280,130, Jul. 25, 1994, abandoned.

[30] Foreign Application Priority Data

Jul. 30, 1993  [JP]  Japan .................... 5-206837

[51] Int. Cl.$^6$ .................................... G03B 7/00
[52] U.S. Cl. ................ 396/158; 396/137; 396/89; 396/155
[58] Field of Search ................. 396/89, 98, 111, 396/112, 118, 155, 158, 137

[56] References Cited

U.S. PATENT DOCUMENTS

| 4,984,005 | 1/1991 | Kazami et al. . | |
|---|---|---|---|
| 5,005,037 | 4/1991 | Akashi et al. . | |
| 5,231,445 | 7/1993 | Onuki et al. ............... | 354/410 |
| 5,260,737 | 11/1993 | Takahashi ................ | 354/413 |
| 5,264,894 | 11/1993 | Kobayashi et al. ......... | 354/415 |
| 5,404,192 | 4/1995 | Konishi et al. ............ | 354/402 |

FOREIGN PATENT DOCUMENTS

| 63-172135 | 7/1988 | Japan . |
| 5-027306 | 2/1993 | Japan . |
| 5-027307 | 2/1993 | Japan . |

OTHER PUBLICATIONS

Patent Abstracts of Japan, vol. 17, No. 305, Jun. 11, 1993.
Patent Abstracts of Japan, vol. 12, No. 443, Nov. 22, 1988.

*Primary Examiner*—Daniel P. Malley
*Attorney, Agent, or Firm*—Fitzpatrick, Cella, Harper & Scinto

[57] ABSTRACT

The present invention relates to a camera having a red-eye reducing function to prevent occurrence of the so-called red-eye phenomenon by preliminarily projecting light to a subject in photo-taking with flash light. The camera of the above type is so arranged that when the photo-taking mode is set to a mode requiring quick photo-taking response suitable for photo-taking of a moving object, for example to the servo AF mode, the light projection for preventing the red eye phenomenon is preliminarily inhibited even in the flash light photo-taking to maintain the quick photo-taking response.

5 Claims, 3 Drawing Sheets

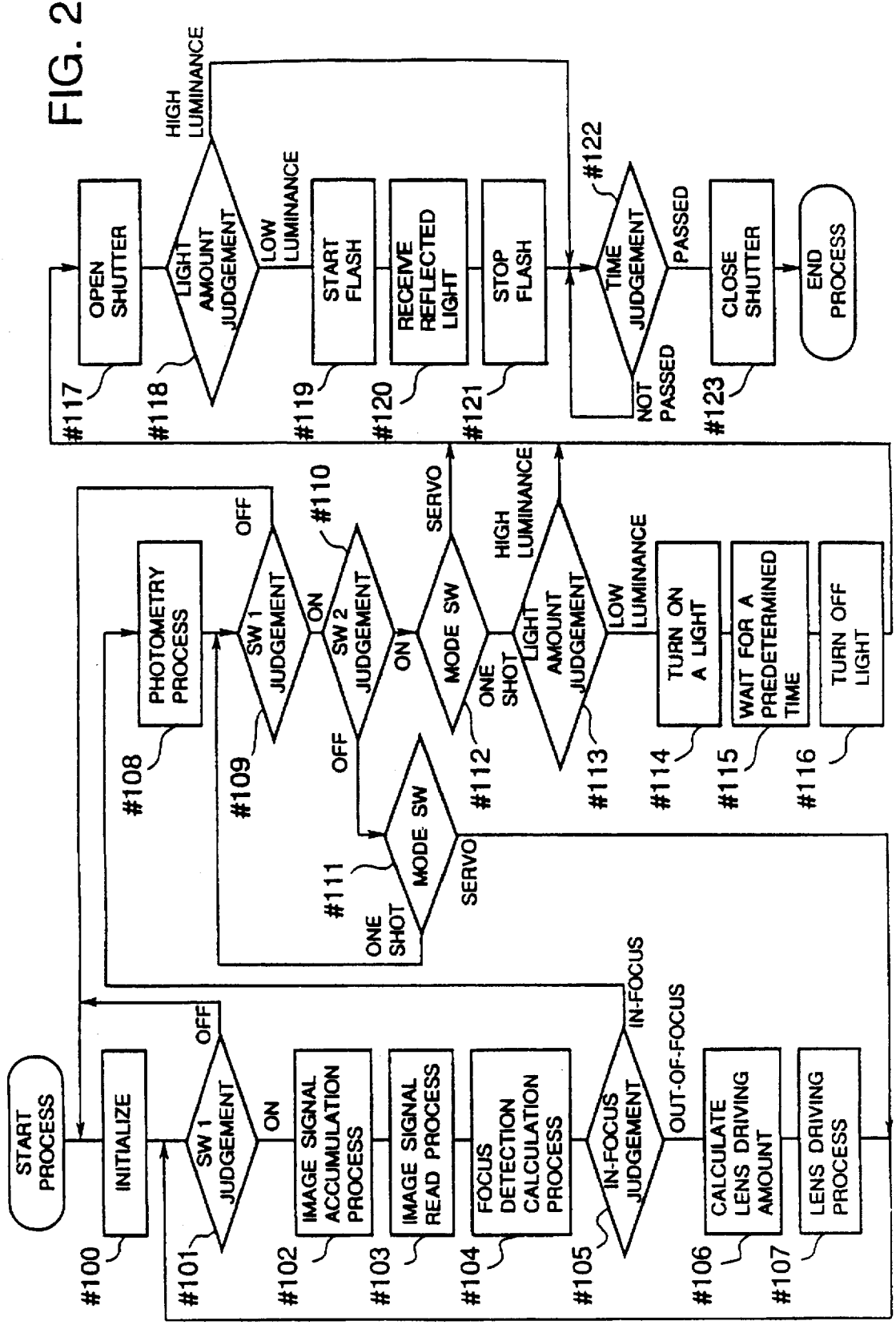

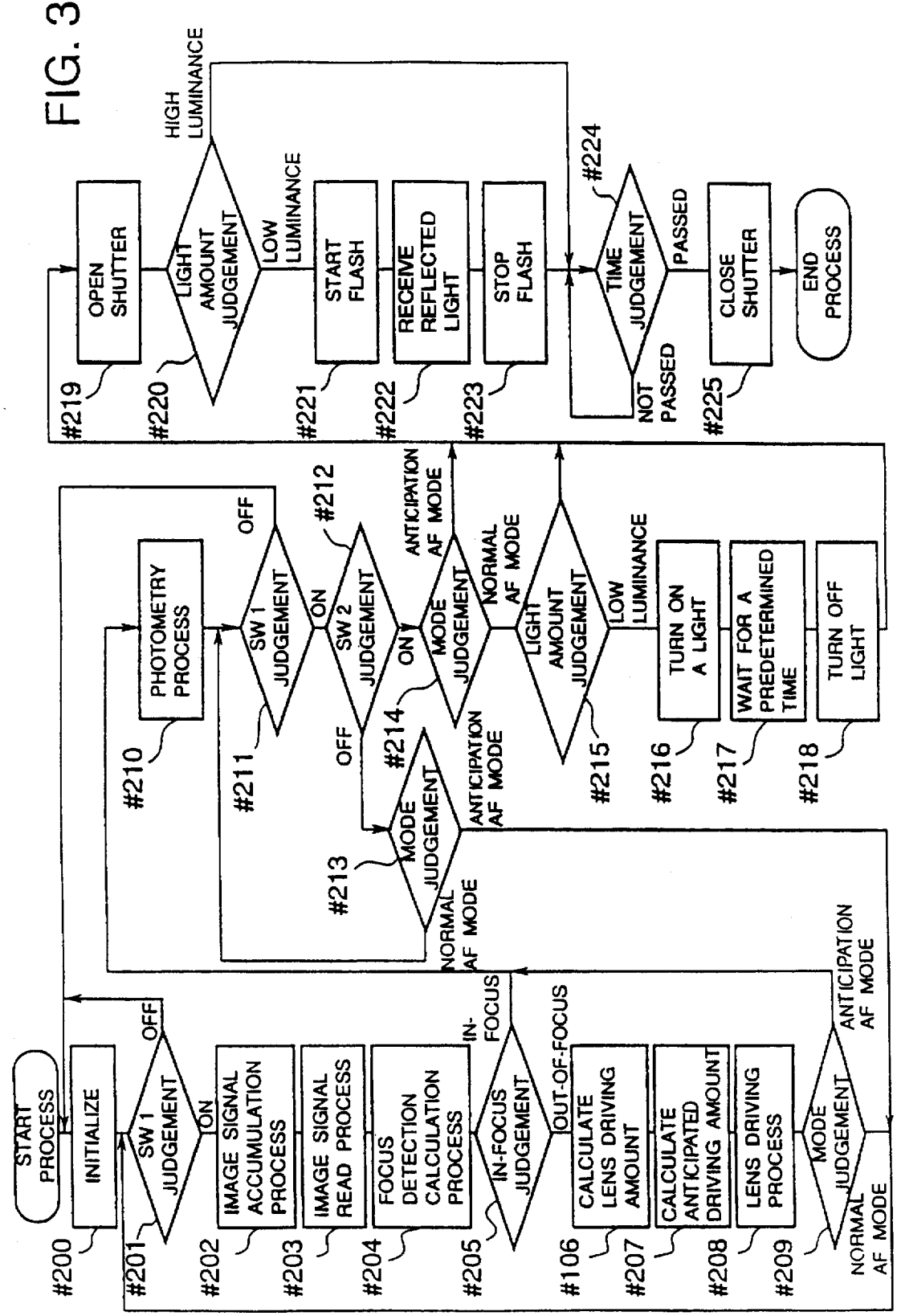

CAMERA HAVING RED-EYE REDUCING FUNCTION

This application is a continuation of application No. 08/280,130 filed Jul. 25, 1994, now abandoned.

BACKGROUND OF THE INVENTION

1. Field of the Invention

The present invention relates to an improvement in an automatic focusing camera provided with a red-eye reducing function in shooting with flash light, having a photo-taking mode suitable for photo-taking of still bodies, such as the one-shot AF (autofocus) mode for inhibiting the operation of a focusing unit once the in-focus state is achieved, and a photo-taking mode suitable for photo-taking of moving bodies, such as the servo AF mode for repeating detection of the focus state after the in-focus state is achieved and permitting the operation of the focusing unit depending upon the focus state or the moving-body anticipation (or predictive) AF mode for performing focusing in accordance with focus detection results and anticipation (or prediction) of movement of a subject.

2. Related Background Art

There are commonly known cameras having the automatic focusing (AF) function to detect the focus condition to automatically adjust the position of the focal point. The cameras of this type are provided with the one-shot AF mode for stopping the AF function (or inhibiting the focusing operation) once focused, and the servo AF mode for repeating the detection of the focal point after being focused and effecting the AF function depending upon the focus condition (or performing the focusing operation).

The former, the one-shot AF mode, is effective to take photographs of still subjects, for example, scenic photographs or commemorative photographs, because re-framing after being focused can be simply made in the state of inhibiting the focusing operation after being focused. The latter, the servo AF mode, is effective to take photographs of moving subjects, for example, sports photographs or race photographs, because the in-focus state is always maintained even with variations of the focus position in the state of continuing the focusing operation after being focused.

Now the processing capacity of microcomputer is so improved, the moving-body anticipation AF is also devised to anticipate a motion of a subject and adjust the focus so as to make the lens system in focus upon shutter drive.

Most recent AF cameras are normally provided with a variety of AF modes as described above and a built-in flash device. Another device uses the method for reducing the red-eye phenomenon by applying light to a man (subject) immediately before exposure in shooting with flash light. The red-eye phenomenon is a phenomenon that when the flash light is used to take a photograph of a man under the low luminance condition, with the pupils of the eyeballs open, the red light is reflected on the eyegrounds so that the eyes look red like rabbit's eyes.

The AF cameras provided with the red-eye reducing function, however, require an illumination operation for several seconds right before exposure in order to reduce the red-eye phenomenon in shooting with flash light. A problem has been pointed out that the illumination operation could abnormally lengthen the time between pressing of shutter button and actual photo-taking (causing a release time lag), losing a shutter chance depending upon a selected AF mode.

SUMMARY OF THE INVENTION

One aspect of the application is to provide an automatic focusing camera which can perform photo-taking with first priority to a shutter chance rather than to the red-eye reduction in the mode in which the shutter chance is critical.

One aspect of the application is to provide, under the above object, a camera provided with inhibiting means which inhibits the operation of red-eye reducing means when the servo AF mode is set through mode setting means or which inhibits the operation of red-eye reducing means when the moving object anticipation AF mode is set through the mode setting means, wherein in the mode in which the shutter chance is critical, the red-eye reducing operation, which is normally performed by the red-eye reducing means prior to flash light photo-taking, is inhibited.

Other objects of the present invention will be apparent from the embodiments described with the accompanying drawings.

BRIEF DESCRIPTION OF THE DRAWINGS

FIG. 2 is a flowchart to show the operation of a micon in FIG. 1; and

FIG. 3 is a flowchart to show the operation of a micon in an automatic focusing camera in the second embodiment of the present invention.

DESCRIPTION OF THE PREFERRED EMBODIMENTS

Figure 1:
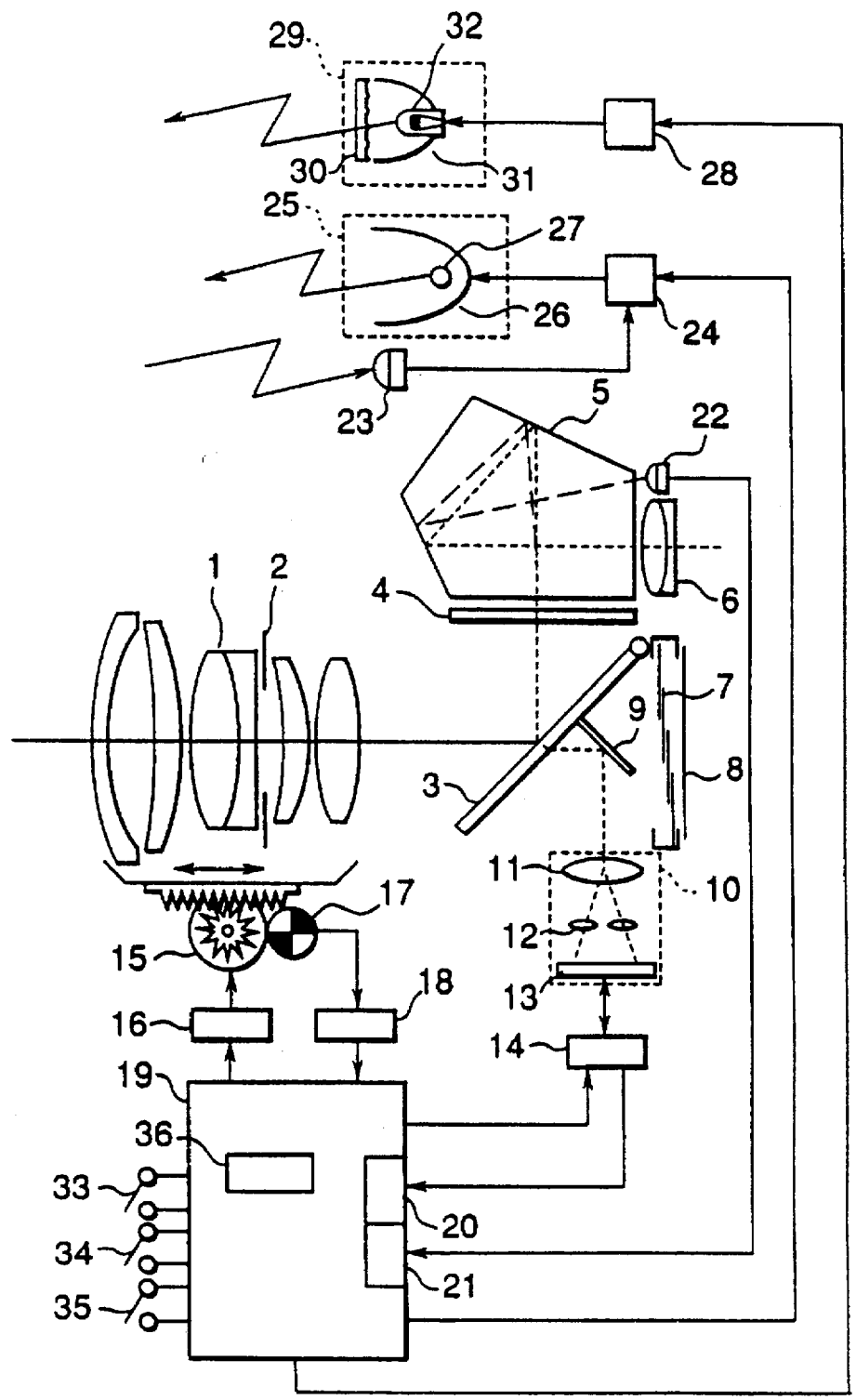
FIG. 1 is a schematic drawing to show an outline of an automatic focusing camera in the first embodiment of the present invention.

The present invention will be described in detail based on the embodiments as shown in the drawings.

FIG. 1 is a schematic drawing to show the structure of main part of an automatic focusing camera in the first embodiment of the present invention.

In FIG. 1, reference numeral 1 designates a photo-taking lens for projecting an image of a subject onto a film surface and onto an AF (autofocus) system, 2 a stop for controlling an amount of exposure, 3 a semitransparent, main mirror for projecting the image of the subject toward a finder during a time except for the moment of exposure, 4 a focusing screen, 5 a pentagonal prism, 6 an eyepiece, 7 a focal plane shutter for controlling the amount of exposure, 8 a film, and 9 a submirror for guiding the subject image to the AF system. Numeral 10 denotes a phase AF unit, which is composed of a field lens 11, separator lenses 12 for separating the subject image incident through the field lens 11, and a photo sensor 13, for example a line sensor, for receiving the subject image thus separated.

Numeral 14 is a driving circuit for the photo sensor 13, 15 a focusing motor for focusing the photo-taking lens 1, 16 a driving circuit for the focusing motor 15, 17 a drive amount detector for detecting an amount of drive of the photo-taking lens 1, and 18 a driving circuit for the driving amount detector 17. Numeral 19 denotes a micon (microcomputer) including memories such as RAM and ROM, 20 an in-micon A/D converter for taking image signals for AF from the photo sensor 13 into micon 19, 21 an in-micon A/D converter for taking outputs from an AE sensor as described next into micon 19, 22 the AE sensor for photometry, and 23 a flash amount detecting sensor for measuring an amount of flash light emitted from a flash device. Numeral 25 is the flash device having a reflecting shade 26 and a xenon tube 27, which is controlled by a flash controlling circuit 24. Numeral 29 is a red-eye reducing device having a diffusion plate 30, a reflecting shade 31, and an incandescent lamp 32. The incandescent lamp 32 is driven by a driving circuit 28.

Numeral 33 is a switch (SW1) for starting the AF operation, which is turned on by a first stroke of the release button, and 34 a switch (SW2) for starting the release operation, which is turned on by a second stroke of the release button. Numeral 35 is a mode switch for providing an instruction of the AF mode, which is off for the one-shot AF mode but on for the servo AF mode. Numeral 36 is a built-in timer counter in micon 19.

The operation of the micon 19 in the camera as so constructed is next described following the flowchart of FIG. 2.

Step 100: An initialization step is carried out to clear the contents in the built-in RAM and initialize the I/O circuits.

Step 101: The micon checks the state of switch SW1 for start of the AF operation. If the switch SW1 is off then the flow branches to step 100; if it is on then the flow branches to step 102.

Step 102: The photo sensor 13 is driven through the driving circuit 14 to accumulate an image of a subject coming through the photo-taking lens 1, the field lens 11, and the separator lenses 12 before a predetermined condition is satisfied.

The predetermined condition is normally such that a level of image signals stored in the photo sensor 13 exceeds a constant value or such that the accumulation time exceeds a constant time.

Step 103: Analog image signals output from the photo sensor 13 are taken through the in-micon A/D converter 20 into the micon 19, where they are stored as image signal data at a predetermined address in RAM.

Step 104: A focus detection calculation is carried out using the image signal data. Specifically, letting A-image and B-image be two subject images separated by the separator lenses 12, a correlation between the two image signals is calculated while shifting the two image signals in mutually opposite directions. Then an amount of defocus is detected by obtaining a shift number by which the correlation value takes an extreme value.

Step 105: If the amount of defocus is within the depth of focus the micon makes a judgement that the lens system is in focus and proceeds to step 108. If the amount of defocus is over the depth of focus the micon makes a judgement that the lens system is out of focus and proceeds to step 106.

First described is a case where the amount of defocus is over the depth of focus, i.e., where the lens system is out of focus.

Step 106: The amount of defocus, calculated in the focus detection calculation process at step 104, is converted into a drive amount of the photo-taking lens 1, using the defocus sensitivity of photo-taking lens 1.

Step 107: The focusing motor 15 is driven through the driving circuit 16 to drive the photo-taking lens 1 by the amount set. Then the micon returns to step 101 to again execute the focus detection process if the switch SW1 is on.

After that, if a judgement is made at step 105 that the amount of defocus is within the depth of focus, i.e., that the lens system is in focus, the flow branches from step 105 to step 108, as described above.

Step 108: Analog signals output from the photometry AE sensor 22 are taken through the in-micon A/D converter 21 into the micon 19, where they are stored as a metered value at a predetermined address in RAM.

Step 109: The micon checks the state of switch SW1. If the switch SW1 is off then the flow branches to step 100 to repeat the processes from the beginning; if the switch SW1 is on the flow branches to step 110.

Step 110: The micon checks the state of switch SW2 for release start. If the switch SW2 is off the flow branches to step 111; if it is on the flow branches to step 112.

Here, let us assume that the switch SW2 is off. Then the micon proceeds to step 111.

Step 111: The micon checks the state of the mode switch 35. If the mode switch 35 is off, that is, if the one-shot AF mode is set, the micon goes to step 109 to wait for the release start. On the other hand, if the mode switch 35 is on, that is, if the servo AF mode is selected, the micon goes to step 101 to continue the focus detection and focusing processes if the switch SW1 is kept on.

After that, when it is detected that the switch SW2 for release start is on, the flow branches from step 110 to step 112, as described previously.

Step 112: The micon checks the state of mode switch 35 in the same manner as at step 111. If the mode switch 35 is off, that is, if the one-shot AF mode is set, the micon proceeds to step 113; if the mode switch 35 is on, that is, the servo AF mode is selected, the micon proceeds to step 117.

Here, let us assume that the one-shot AF mode is set.

Step 113: The micon compares the metered value stored in the photometry process at step 108 with a predetermined value. If the metered value is lower than the predetermined value, that is, if the luminance is low, the flow branches to step 114; if the metered value is higher than the predetermined value (i.e., the luminance is high) the flow branches to step 117.

Step 114: The micon lights up the incandescent lamp 32 through the driving circuit 28 to illuminate a subject not shown, starting the red-eye reducing operation.

Step 115: In order to ensure the red-eye reduction by decreasing the size of the pupils of the subject, the timer counter 36 counts a constant time. After the constant time is elapsed, the micon proceeds to step 116 to switch off the light of incandescent lamp 32.

Step 116: The incandescent lamp 32 is switched off through the driving circuit 28 to end the red-eye reducing operation.

The flow proceeds or branches to step 117, if the operation of step 116 is finished, if it is judged at step 112 that the servo AF mode is set, or if it is judged at step 113 that the luminance is high.

Step 117: The main mirror 3 and submirror 9 are driven to make the subject image reach the surface of film 8 through the photo-taking lens 1, thus starting exposure on film 8 with the shutter 7 open.

Step 118: It is judged whether the metered value stored in the photometry process at step 108 is greater than the predetermined value. If the metered value is lower than the predetermined value, that is, if the luminance is low, the flow branches to step 119; if the metered value is higher than the predetermined value the flow branches to step 122.

Here, assuming the luminance is low, the flow branches to step 119.

Step 119: The micon starts light emission of the xenon tube 27 in the flash device 25 through the control circuit 24.

Step 120: The micon 19 captures through the flash light controlling circuit 24 information of the light amount detecting sensor 23 detecting the flash light emitted from the flash device 25 and then reflected by the subject.

Step 121: Based on the captured information about the flash light amount, whether the flash amount reaches a predetermined flash light amount is checked. When it reaches the predetermined value, the light emission of xenon tube 27 is stopped.

Step 122: The shutter is kept open before a predetermined time (corresponding to the shutter speed and assumed to be set to a synchronized time upon emission of flash light) is elapsed after the opening of the shutter at step 117.

Step 123: The shutter 7 is closed to complete the exposure on film 8, and the main mirror 3 and the submirror 9 are driven to make the subject image through the photo-taking lens 1 reach the finder and the AF unit.

According to the first embodiment as described above, the operation of the red-eye reducing function is inhibited when the servo AF mode is set, even if the luminance of subject is so low as to require actuation of the flash device. Therefore, the camera would lose no shutter chance in the servo AF mode in which the shutter chance is critical in particular.

Second Embodiment

FIG. 3 is a flowchart to show the operation of an automatic focusing camera in the second embodiment of the present invention. The construction of the camera is the same as that of the first embodiment except that the normal AF (one-shot AF) mode is set if the mode switch 35 is off while the (moving object) anticipation AF mode is set if the mode switch 35 is on, and, therefore, is omitted to describe herein.

Step 200: An initialization step is carried out to clear the contents in the built-in RAM and initialize the I/O circuits. Especially, an anticipation AF mode flag is cleared to effect setting of the normal AF mode.

Step 201: The micon checks the state of switch SW1 for start of the AF operation. If the switch SW1 is off then the flow branches to step 200; if it is on then the flow branches to step 202.

Step 202: The photo sensor 13 is driven through the driving circuit 14 to accumulate an image of a subject passing through the photo-taking lens 1, the field lens 11, and the separator lenses 12 before a predetermined condition is satisfied.

The predetermined condition is normally such that a level of image signals stored in the photo sensor 13 exceeds a constant value or such that the accumulation time exceeds a constant time.

Step 203: Analog image signals output from the photo sensor 13 are taken through the in-micon A/D converter 20 into the micon 19, where they are stored as image signal data at a predetermined address in RAM.

Step 204: A focus detection calculation is carried out using the image signal data. Specifically, letting A-image and B-image be two subject images separated by the separator lenses 12, a correlation between the two image signals is calculated while shifting the two image signals in mutually opposite directions, thus obtaining an amount of defocus corresponding to a shift number by which the correlation value takes an extremal value.

Step 205: If the amount of defocus is within the depth of focus the micon makes a judgement that the lens system is in focus and proceeds to step 210. If the amount of defocus is over the depth of focus the micon makes a judgement that the lens system is out of focus and proceeds to step 206.

First described is a case where the amount of defocus is over the depth of focus, i.e., where the lens system is out of focus.

Step 206: The amount of defocus, calculated in the focus detection calculation process at step 204, is converted into a drive amount of the photo-taking lens 1, using the defocus sensitivity of photo-taking lens 1.

Step 207: If the focus detection is repeated twice or more and if a previous focus detection result shows the out-of-focus state, the micon calculates a drive correction amount of the lens for keeping the lens system in focus even with the subject moving during a predetermined time duration between latest focus detection and next drive of the shutter, based on the previous focus detection result (defocus amount) and a current (latest) focus detection result (defocus amount), and switches the AF mode into the anticipation AF mode (or sets the anticipation AF mode flag to "1"). Since the anticipation AF itself is well known, for example as described in U.S. Pat. No. 5,005,037, the details thereof are omitted.

Step 208: The focusing motor 15 is driven through the driving circuit 16 to drive the photo-taking lens 1 by the amount set.

Step 209: The micon checks which AF mode is set between the normal AF mode and the anticipation AF mode. If the anticipation AF mode flag is "1" the AF mode is the anticipation mode. Thus, the flow branches to step 210. If the normal AF mode is set the flow returns to step 201, and if the switch SW1 is on the focus detection process is again carried out.

After that, if it is judged at step 205 that the amount of defocus is within the depth of focus, i.e., that the lens system is in focus, or if it is confirmed at step 209 that the anticipation mode is set, the flow branches to step 210.

Step 210: Analog signals output from the photometry AE sensor 22 are taken through the in-micon A/D converter 21 into the micon 19, where they are stored as a metered value at a predetermined address in RAM.

Step 211: The micon checks the state of switch SW1. If the switch SW1 is off then the flow branches to step 200 to repeat the processes from the beginning; if the switch SW1 is on the flow branches to step 212.

Step 212: The micon checks the state of switch SW2 for release start. If the switch SW2 is off the flow branches to step 213; if it is on the flow branches to step 214.

Here, let us assume that the switch SW2 is off. Then the micon proceeds to step 213.

Step 213: The micon checks the state of the anticipation AF flag. If the normal AF mode is set the flow branches to step 211 to wait for the release start; if the anticipation AF mode is set the flow branches to step 201 to execute the focus detection and focusing processes if the switch SW1 is on.

After that, when it is detected that the switch SW2 for release start is turned on, the flow branches from step 212 to step 214, as described above.

Step 214: The micon checks the state of the anticipation AF flag in the same manner as at step 213. If the normal AF mode is set the flow branches to step 215; if the anticipation AF mode is set the flow branches to step 219.

Here, let us assume that the normal AF mode is set.

Step 215: The micon compares the metered value stored in the photometry process at step 208 with a predetermined value. If the metered value is lower than the predetermined value, that is, if the luminance is low, the flow branches to step 216; if the metered value is higher than the predetermined value (i.e., if the luminance is high) the flow branches to step 219.

Step 216: The micon lights up the incandescent lamp 32 through the driving circuit 28 to illuminate a subject not shown, starting the red-eye reducing operation.

Step 217: In order to ensure the red-eye reduction by decreasing the size of the pupils of the subject, the timer counter 36 counts a constant time. After the constant time is elapsed, the micon proceeds to step 218 to switch off the light of incandescent lamp 32.

Step 218: The incandescent lamp 32 is switched off through the driving circuit 28 to end the red-eye reducing operation.

The flow proceeds or branches to step 219, if the operation of step 218 is finished, if it is judged at step 214 that the servo AF mode is set, or if it is judged at step 215 that the luminance is high.

Step 219: The main mirror 3 and submirror 9 are driven to make the subject image reach the surface of film 8 through the photo-taking lens 1, thus starting exposure on film 8 with the shutter 7 open.

Step 220: It is judged whether the metered value stored in the photometry process at step 208 is greater than the predetermined value. If the metered value is lower than the predetermined value, that is, if the luminance is low, the flow branches to step 221; if the metered value is higher than the predetermined value the flow branches to step 224.

Here, assuming the luminance is low, the flow branches to step 221.

Step 221: The micon starts light emission of the xenon tube 27 in the flash device 25 through the control circuit 24.

Step 222: The micon 19 captures through the flash light controlling circuit 24 information of the light amount detecting sensor 23 detecting the flash light emitted from the flash device 25 and then reflected by the subject.

Step 223: Based on the captured information about the flash light amount, whether the flash amount reaches a predetermined flash light amount is checked. When it reaches the predetermined value, the light emission of xenon tube 27 is stopped.

Step 224: The shutter is kept open before a predetermined time (corresponding to the shutter speed) is elapsed after the opening of the shutter at step 219.

Step 225: The shutter 7 is closed to complete the exposure on film 8, and the main mirror 3 and the submirror 9 are driven to make the subject image through the photo-taking lens 1 reach the finder and the AF unit.

According to the second embodiment as described above, the operation of the red-eye reducing function is inhibited when the anticipation AF mode is set, even if the luminance of subject is so low as to require actuation of the flash device. Therefore, the camera would lose no shutter chance in the anticipation AF mode in which the shutter chance is critical in particular.

The flow of FIG. 2 may be so modified that the judgement of the AF mode is carried out after step 107 to branch to step 101 for the one-shot mode or to step 108 for the servo mode.

What is claimed is:

1. A camera operable in a first autofocus mode in which a first operation of a shutter release operation member initiates a repeated operation of focus detection and lens driving regardless of an in-focus or out-of-focus state, and operable in a second autofocus mode in which the first operation of the shutter release operation member initiates focus detection and lens driving until an in-focus state is attained and then prohibits lens driving, said camera comprising:

a red-eye-effect prevention circuit actuated by a second operation of said shutter release operation member in the second autofocus mode to prevent a red-eye-effect caused by flash light photography; and an exposure starting circuit which initiates an exposure, wherein in the first autofocus mode, exposure is initiated after a second operation of said shutter release operation member, and in the second autofocus mode, exposure is initiated after activation of said red-eye-effect prevention circuit.

2. A camera according to claim 1, wherein said first autofocus mode is a servo mode and said second autofocus mode is a one-shot mode.

3. A camera according to claim 1, wherein said first autofocus mode is an anticipation autofocus mode.

4. A camera according to claim 3, wherein in said anticipation autofocus mode, a lens drive amount is performed based on a previously detected in-focus state and a currently detected focus state.

5. A camera according to claim 1, wherein said red-eye-effect prevention circuit performs a light projection operation before the start of photo-taking with flash light.

* * * * *

UNITED STATES PATENT AND TRADEMARK OFFICE
CERTIFICATE OF CORRECTION

PATENT NO. : 5,721,983
DATED : February 24, 1998
INVENTOR(S) : ETSURO FURUTSU

It is certified that error appears in the above-identified patent and that said Letters Patent is hereby corrected as shown below:

Column 1

Line 54, change "eyegrounds" to --eyes--

Column 3

Line 67, "on" should read --on,--.

Column 4

Line 2, "off" should read --off,--.
Line 3, "on" should read --on,--.

Column 5

Line 26, "is omitted to describe" should read --description thereof is omitted--.
Line 56, "extremal" should read --extreme--.

Signed and Sealed this

Eleventh Day of August 1998

Attest:

BRUCE LEHMAN

*Attesting Officer*      Commissioner of Patents and Trademarks